United States Patent [19]

Hitchcock

[11] Patent Number: 4,860,189
[45] Date of Patent: Aug. 22, 1989

[54] FULL BRIDGE POWER CONVERTER CIRCUIT

[75] Inventor: Leonard J. Hitchcock, Montrose, Pa.

[73] Assignee: International Business Machines Corp., Armonk, N.Y.

[21] Appl. No.: 171,098

[22] Filed: Mar. 21, 1988

[51] Int. Cl.4 .......................................... H02M 7/538
[52] U.S. Cl. ..................................... 363/132; 363/98
[58] Field of Search ..................... 307/300, 571, 584; 363/17, 56, 98, 132

[56] References Cited

U.S. PATENT DOCUMENTS

| | | | |
|---|---|---|---|
| 3,737,755 | 6/1973 | Calkin et al. | 363/17 |
| 4,204,266 | 5/1980 | Kammiller et al. | 363/98 |
| 4,330,819 | 5/1982 | Foch et al. | 363/98 |
| 4,511,815 | 4/1985 | Wood | 307/584 |
| 4,608,499 | 8/1986 | Rathmann | 363/17 |
| 4,626,980 | 12/1986 | McGuire | 363/56 |
| 4,639,849 | 1/1987 | Noworolski et al. | 363/132 |
| 4,691,270 | 9/1987 | Pruitt | 363/132 |
| 4,694,206 | 9/1987 | Weinberg | 307/571 |

OTHER PUBLICATIONS

Hayes et al.; "Zero-Voltage Switching In A Constant Freq. Digitally Controlled Resonant DC/DC Power Converter"; IEEE Feb. 5, '88.
Jovanovic et al.; "Zero-Voltage Switching Technique In High Freq. OFF-Line Converters"; IEEE Feb. 1-5, 1988.

*Primary Examiner*—Peter S. Wong
*Assistant Examiner*—Jeffrey Sterrett
*Attorney, Agent, or Firm*—Mark Levy; Richard E. Bee

[57] ABSTRACT

A full bridge non-resonant switching circuit is disclosed which has an inductive device and four switches. Parasitic controlling mechanisms are operatively connected to the four switches to control inductive energy release in order to switch current through the switches at substantially zero voltage.

1 Claim, 3 Drawing Sheets

FULL BRIDGE POWER CONVERTER CIRCUIT

BACKGROUND OF THE INVENTION

The present invention relates to a full bridge circuit and, more particularly, to a full bridge circuit that allows zero voltage switching and that minimizes the effects of leakage inductance without using external snubbing circuitry.

Complexity of circuitry to obtain phase modulated square wave drives is generally costly, requires a significant amount of space and results in an undesirably high failure rate. In general, fewer components in the switching section would allow for a more compact layout, minimizing radiating loop area and parasitic inductance connecting components.

As switching frequency increases, power losses in the switching device become primarily switching losses. Therefore conventionally, only lower power converters were possible at higher switching frequencies. Zero voltage switching, however, minimizes such power losses.

As demand for higher switching frequency occurs, it becomes even more important to include parasitic devices, such as diodes and capacitors, in the design process. Utilizing the parasitics of transformers and transistors can be an advantage.

The drain-source voltage of transistors should be near zero volts to minimize or to avoid turn-on losses and electromagnetic interference. An example of zero voltage switching technique used in a half bridge converter is disclosed in "Zero-Voltage-Switching Technique In High-Frequency, Off-Line Converters" by M. Jovanovic et al, third annual IEEE Applied Power Electronics Conference, Feb. 1-5, 1988 (pp. 22-32). This paper discusses a half bridge zero-voltage-switching technique to overcome limitations of a zero-current-switch quasi-resident converter. Switching turn-on losses of power switches are eliminated by shaping the transistor's voltage waveform so that the voltage reduces to zero prior to turn-on.

A snubber circuit is commonly used with each transistor in bridge circuits to prevent the simultaneous presence of high voltage and high current in the transistor junction each time it is biased off. This condition of high voltage and high current arises because the load imposed on the transistor by the transformer's primary winding is highly inductive, and the load current therefore continues to flow, even after the transistor has been biased off. The snubber circuit serves as a bypass route for this current, avoiding the transistor junction.

Snubber circuits typically include a series diode and capacitor shunting each transistor. When the transistor is biased on, the diode ensures that the capacitor does not affect the transistor's operation. When the transistor is first biased off, however, the current that previously flowed through the transistor and that continues to flow because of the load's inductance, is diverted through the diode to charge the capacitor to a predetermined voltage. Thereafter, when the transistor is again turned on, a special circuit discharges the capacitor to its original state. This discharge circuit frequently takes the form of a resistor connected in parallel with the diode, such that discharge current is routed through the resistor and transistor.

U.S. Pat. No. 4,626,980 issued to McGuire discloses a non-dissipative snubber circuit for use in a power bridge circuit having a pair of switching power transistors for controllably coupling pulses of electrical current in opposite directions through the primary winding of a power transformer. The current flowing through the transformer's primary winding is diverted to charge one of the snubber capacitors each time the associated transistor is switched off. When the transistor is again switched on, the capacitor is reinitialized by discharging it through an inductor. In a full bridge configuration, the discharge current is used to discharge a separate snubber capacitor shunting one of two additional switching power transistors connected to the opposite side of the primary winding. The snubber circuitry in the aforementioned reference is relatively complex, but zero voltage switching is not considered therein.

Another approach to providing power supply drivers with near zero voltage switching is described in "Zero-Voltage Switching In A Constant Frequency Digitally Controlled Resonant DC-DC Power Converter" by J. G. Hayes et al, third annual IEEE Applied Power Electronics Conference, Feb. 1-5, 1988 (pp. 360-367). A resonant converter comprises resonating inductance and capacitance elements that store all of the energy that eventually is transferred to a load. In the range between 70% and 100% load, zero voltage switching is possible. Input voltage for the aforementioned circuit is 36 v and output power is on the order of 10 w.

It would be advantageous to provide a low cost, full bridge power switching circuit.

It would also be advantageous to provide such a circuit which would require a minimum amount of circuit board space.

Further, it would be advantageous to provide such a circuit capable of zero voltage switching for a range substantially between 0% and 100% load.

It would further be advantageous to provide such a circuit in an off-line converter having a topology that would be effective at high switching frequencies for a range of power of between 50 w to 2 Kw or higher.

It would also be advantageous to provide such a circuit for generating phase modulated square waves.

It would also be advantageous to provide a non-resonating circuit that would perform in accordance with well-known stabilizing techniques.

It would further be advantageous to provide such a circuit having only one phase modulating device and only one one-gate drive transformer.

It would also be advantageous to operate such a circuit to minimize electromagnetic interference and power losses.

It would also be advantageous to provide a switching circuit the components of which need not be rated higher than they would have been if zero voltage switching were not contemplated.

Moreover, it would be advantageous to provide a full bridge circuit having a low failure rate due to few components being subjected to line voltage.

SUMMARY OF THE INVENTION

In accordance with the present invention there is provided a full bridge non-resonant switching circuit which has an inductive device and four switches. Parasitic controlling mechanisms are operatively connected to the four switches to control inductive energy release in order to switch current through the switches at substantially zero voltage.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 1:
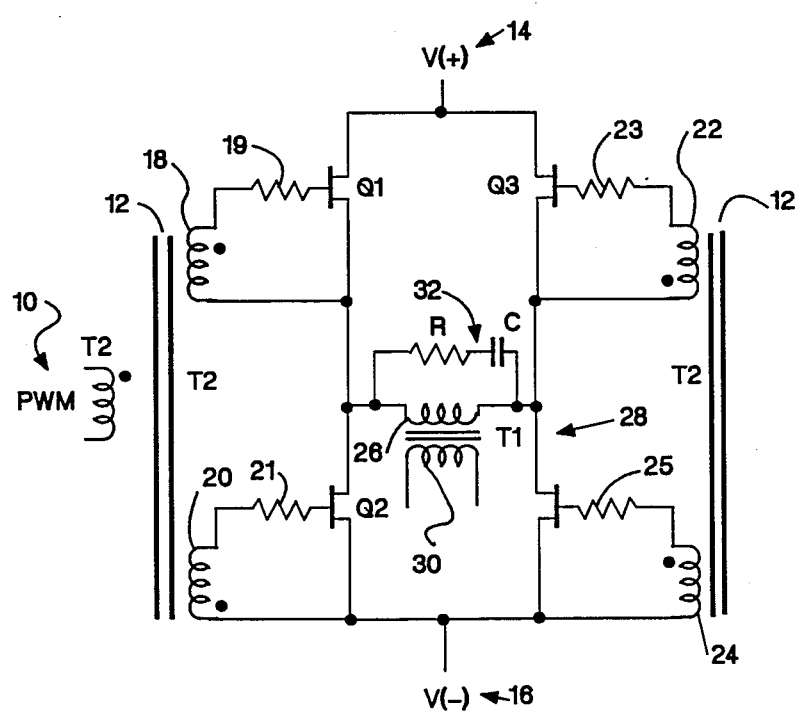
FIG. 1 is a schematic diagram of a full bridge switching circuit of the prior art.

Referring now to FIG. 1, there is shown a full bridge switching circuit as is well known in the prior art. Pulse width modulator (PWM) 10, such as a Model 3825 available from Unitrode Corp., Lexington, Mass. is operatively connected to isolating transformer 12 with 12-volt peak secondary coils, shown at both sides of the circuit. Transformer 12 receives a variable on-time pulse at a constant frequency. PWM 10 provides a signal of 200 KHz in the preferred embodiment with a variable duty cycle. Switching frequencies in excess of 1 MHz would also be possible.

Four transistors Q1, Q2, Q3 and Q4 are electrically connected by suitable means. The drains of transistors Q1 and Q3 are tied to the positive side of DC voltage supply 14 and the sources of transistors Q2 and Q4 are tied to the negative side 16 of said voltage supply. A voltage of up to 400 v is typical of digital processor power supplies.

The secondary coils or windings 18, 20, 22 and 24 of transformer 12 are operatively connected to transistors Q1, Q2, Q3 and Q4 via resistors 19, 21, 23. and 25, respectively. A primary coil 26 of an inductive device 28, such as a transformer or a motor, is connected to the source of transistors Q1 and Q3 and to the drain of transistors Q2 and Q4. The secondary coil 30 of transformer 28 can be connected to a load, not shown. An RC circuit 32 is connected in parallel with primary coil 26.

When inductive device 28 is turned off (i.e., voltage is no longer supplied to the device 28), undesirable electromagnetic interference is generated. Electromagnetic interference occurs when an inductor is turned off or a capacitor is turned on, unless the inductor current or the capacitor voltage was substantially zero.

A sample PWM drive for a switching circuit that generates square waves that are phase modulated is described in "HEXFET Databook, Power MOSFET Application and Product Data" published by International Rectifier Corp., third edition (1985) pp. A-128 through A-131.

Figure 2:
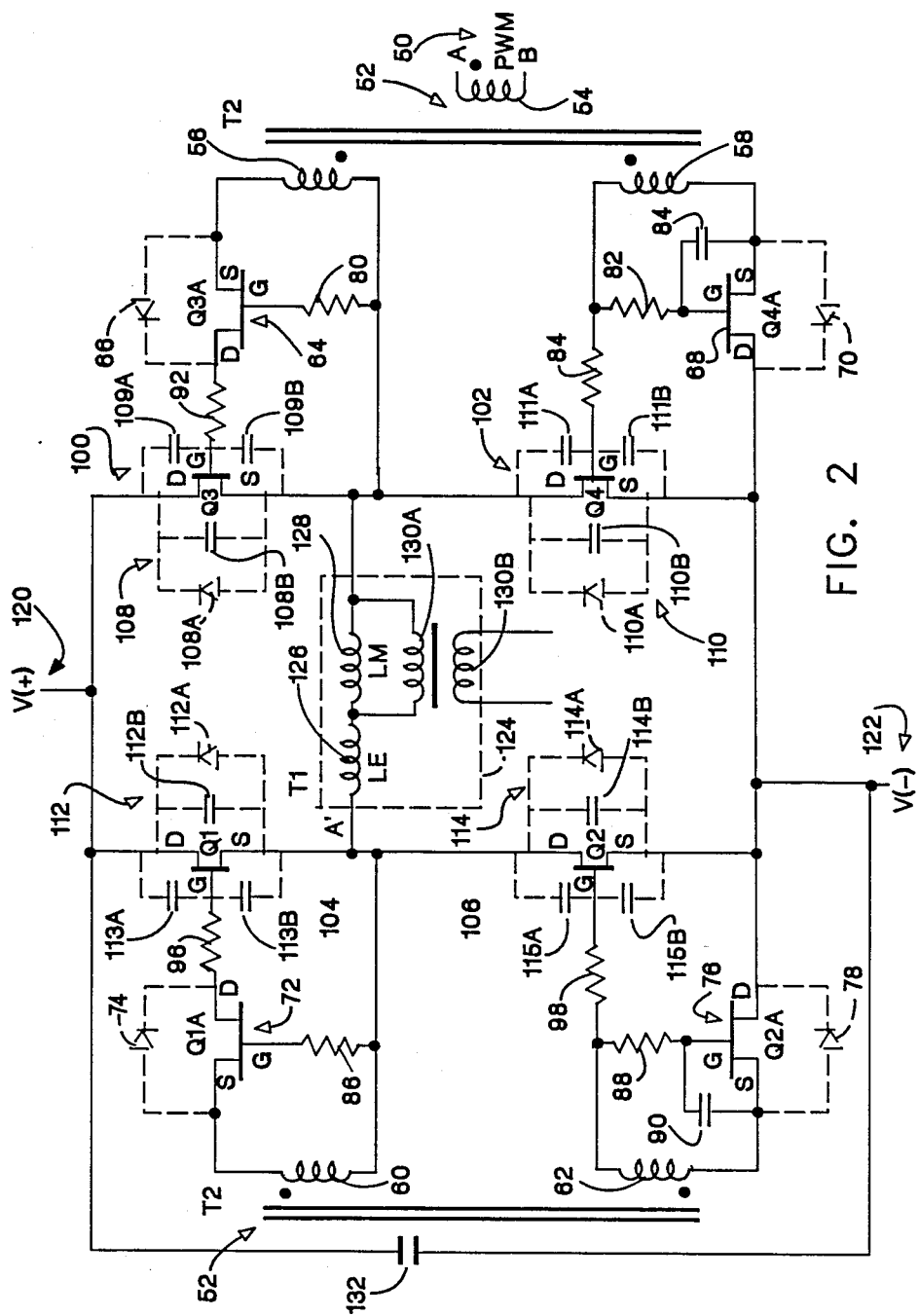
FIG. 2 is a schematic diagram of the full bridge switching circuit in accordance with the present invention.

Referring now also to FIG. 2, a circuit in accordance with the present invention is provided to allow low or zero voltage switching, thus minimizing or eliminating electromagnetic interference.

Figure 3:
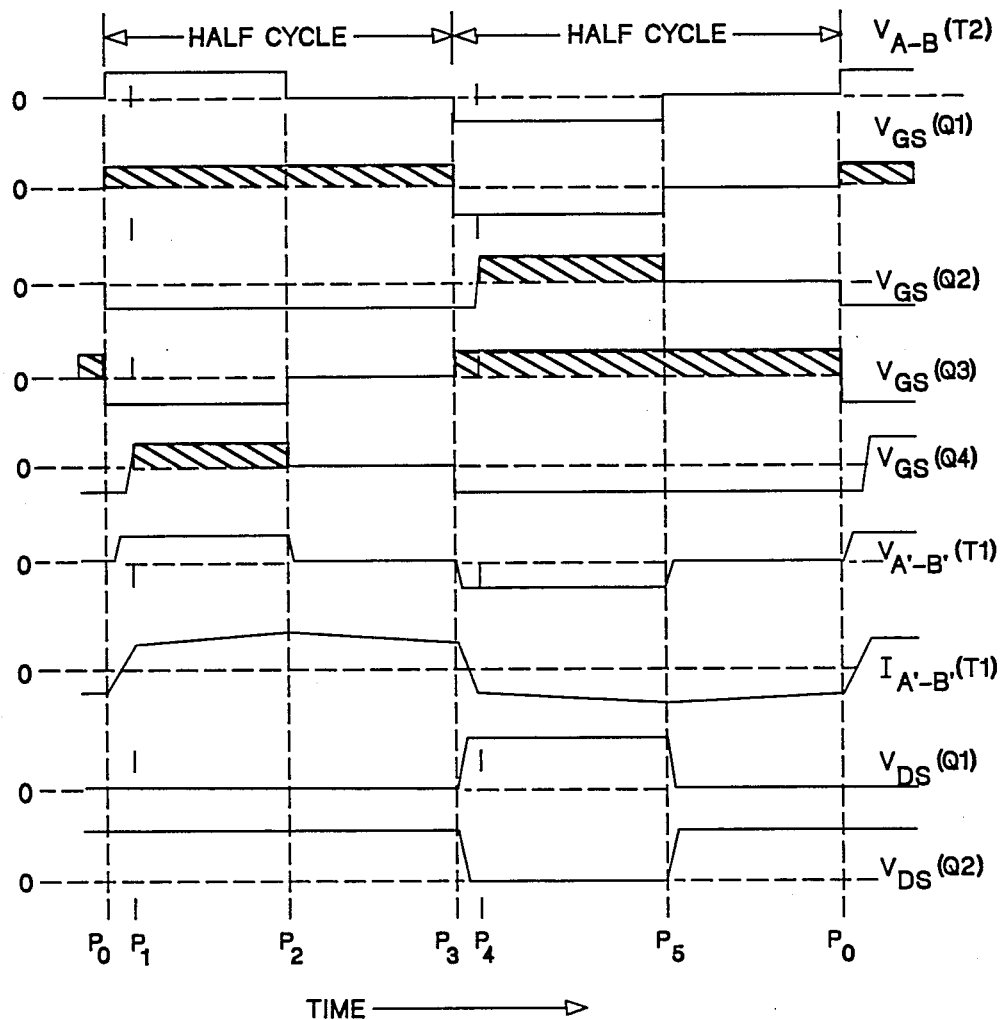
FIG. 3 is a timing diagram of transistor and transformer voltage levels generated by the circuit shown in FIG. 2.

FIG. 3 is a timing diagram of transformer and transistor voltage levels generated by the circuit shown in FIG. 2 and should be referred to in conjunction therewith.

Pulse width modulator (PWM) 50 generates a signal across the primary winding 54 of transformer T2 (reference number 52, shown on both sides of FIG. 2. The voltage potential of the primary winding of transformer T2 between points A and B in the FIG. 3. Transformer T2 has four secondary coils or windings 56, 58, 60 and 62. Connected to secondary coil 56 is a transistor Q3A, shown generally at reference numeral 64. Parasitic diode 66 is connected between the source and drain of transistor Q3A. All parasitic devices are shown in phantom on FIG. 2. Likewise, another transistor Q4A (68) is operatively connected to secondary coil 58. Parasitic diode 70 is connected across the source and drain of this transistor Q4A. Another transistor Q1A (72) is operatively connected to secondary coil 60. Parasitic diode 74 is connected across the source and drain of this transistor Q1A. Finally, a fourth transistor Q2A (76) is operatively connected to secondary coil 62.

Parasitic diode 78 is connected across the source and drain of this transistor Q2A.

Connected between the secondary coil 56 and the gate of transistor Q3A is resistor 80. Similarly, connected between the secondary coil 58 and the gate of transistor Q4A is another resistor 82; between secondary coil 60 and the gate of transistor Q1A is resistor 86; and between secondary coil 62 and the gate of transistor Q2A is resistor 88.

Capacitor 90 is connected between the gate and source of transistor Q2A.

Connected to the drain of transistor Q3A is resistor 92, the opposite end of which is connected to a gate of switching transistor Q3, shown generally at reference numeral 100. To reduce turn-on losses, field effect transistors (FETS) are selected for all switching transistors. They require low drain to source charge to turn on at full voltage. Thus, the highest "on resistance" FET should be chosen that will function in the circuit. Such FETS are generally least expensive. It is also desirable that the FET parasitic diode have a low "on voltage" which often means poor recovery. Fortunately, recovery time of the FET parasitic diode is unimportant in the present invention.

Connected to resistor 82 is resistor 84, the opposite end of which is connected to the gate of switching transistor Q4, shown generally at reference numeral 102; connected to the drain of transistor Q1A is resistor 96, the opposite end of which is connected to the gate of transistor 104; and connected to resistor 88 is resistor 98, the opposite end of which is connected to the gate of switching transistor Q2, referred to generally at reference numeral 106.

Connected between the drain and source of transistor Q3 and shown in phantom are so-called parasitic devices 108 comprising a diode 108a and a capacitor 108b in parallel. A pair of parasitic capacitors 109a and 109b is also shown in phantom and connected between the drain and gate and the source and gate of transistor Q3.

Parasitic devices are also connected to transistor Q4 and are shown generally at reference numeral 110. Parasitic diode 110a and parasitic capacitor 110b are connected in parallel across the drain and source of transistor Q4. Likewise, parasitic capacitors 111a and 111b, shown in phantom, are connected across the drain and gate and the source and gate of transistor Q4.

Parasitic devices 112 comprising a parasitic diode 112a and a parasitic capacitor 112b, shown in phantom, are connected in parallel across the drain and source of switching transistor Q1. Likewise, parasitic capacitors 113a and 113b are connected across the drain and gate and the source and gate of transistor Q1.

Finally, parasitic devices 114 comprising parasitic diode 114a and parasitic capacitor 114b are connected across the drain and source of transistor Q2. Parasitic capacitors 115a and 115b are also connected across the drain and gate and the source and gate of transistor Q2.

A source of voltage potential, not shown, supplies positive and negative charge 120 and 122, respectively, to the circuit. Connected between points A' and B' is transformer T1 shown generally at reference numeral 124. Within transformer T1 is a leakage inductance 126 and a magnetizing inductance 128. Transformer T1 (reference number 124) has a primary coil 130a which is in operative relationship to a secondary coil 130b. Secondary coil 130b, in turn, is connected to a load, not shown.

Capacitor 132 is connected between positive and negative voltage sources 120 and 122.

Time Period P1

In operation, in period time P1 to P2 (FIG. 3), the voltage $V_{AB}$ the primary of transformer T2 is high (i.e., voltage at point A is positive with respect to voltage at point B), transistors 282 Q1 and Q4 are switched on and $V_{A'B'}$ across transformer T1 is positive. The current from A' to B' of transformer T1 is in a positive direction.

Time Period P2

In period P3, $V_{AB}$ across the primary of transformer T2 goes to zero volts. $V_{GS}$ of transistor Q1 does not change since transistor Q1A is still off and its parasitic diode 74 is reverse biased. Gate capacitances 113a and 113b of transistor Q1 are not discharged and transistor Q1 stays on. At the same time, transistor Q4 turns off due to the forward biasing of parasitic diode 70.

The current in transformer T1 is now routed to drain-gate capacitances 109a and 111a of transistors Q3 and Q4, respectively, as well as to drain-source capacitances 108b and 110b of transistors Q3 and Q4, respectively. During this time, transistors Q3 and Q4 are off but the voltage across capacitance 110b is increasing and voltage across capacitance 108b is decreasing. The rate of change is load dependent. When $V_{DS}$ for transistor Q3 reaches a negative value, its parasitic diode 108a turns on to keep the current in transformer T1 circulating among devices 112, T1 and 108a.

During this time transformer T1 current is related to the output inductor current, not shown, by the turns ratio of transformer T1. The output inductor acts like a current source to supply the necessary current. Accordingly, even near no load connected to coil 130b and high line (voltage source 120 and 122 being highest), diode 108a is turned on.

Time Period P3

In period P3 to P5, $V_{AB}$ of transformer T2 goes negative. When $V_{GS}$ of transistor Q1A reaches approximately +4 v, transistor Q1A turns on, which pulls $V_{GS}$ of transistor Q1 to a negative level. Transistor Q1 turns off when it reaches $V_{GS}$ of about +4 v, so there is minimal delay. At the same time, transistor Q3 also turns on rapidly since parasitic diode 66 of transistor Q3A is forward biased. Parasitic diode 66 of transistor Q3 is conducting, so transistor Q3 turns on at approximately zero voltage and current through transistor Q3 from source to drain is negative.

During this time transformer T1 current discharges the gate-drain capacitances 113a and 115a of transistors Q1 and Q2 respectively and the source-drain capacitances 112b and 114b of transistors Q1 and Q2. When VDS of transistor Q2 reaches zero, its parasitic diode 114a turns on. At lighter loads or high line, $V_{DS}$ of transistor Q2 may not reach zero volts.

The energy in leakage inductance 126 and magnetizing inductance 128 of transformer T1 is transferred in a resonant manner to parasitic capacitors 113a, 115a, 112b and 114b to set them to a desirable level in anticipation of the turn on of transistor Q2. This avoids dumping the energy in leakage inductance 126 into a snubber.

As opposed to the circuit described in the aforementioned Hayes et al reference in which a sinusoidal transformer current waveform exists, the present invention is not a resonant converter, but merely charges and discharges the parasitic capacitances 113a, 115a, 112b and 114b in a resonant manner. The waveform of the transformer current $I_{AB}$ (T1) (FIG. 3) is not sinusoidal but appears as a conventional full bridge pulse width modulated converter.

If a snubber were used, the snubber and parasitic capacitors would have to be recharged causing stress on components, electromagnetic interference, and extra losses. The energy in leakage inductance 126 herein is redirected to be useful. Although minimizing leakage inductance is not important for operation of the switching circuit, it may be important for minimizing radiated fields.

Time Period P4

From the foregoing description, it can be see that when $V_{AB}$ of transformer T2 first goes negative (beginning of time period P3), transistor Q1 quickly turns off and transistor Q3 turns on. Transistor Q2 also turns on at period P4, after a fixed delay independent of parasitics. This assures that transistors Q1 and Q2 do not turn on simultaneously, resulting in a short circuit of voltage supply 120 and 122. The delay in turning transistor Q2 on between the start of period P3 and period P4 is established by providing resistor 88 in transistor Q2A gate and capacitor 90 from gate to source which dominates the parasitic gate capacitance of transistor Q2A. When $V_{GS}$ of transistor Q2A reaches +4 v after the delay at period P4, transistor Q2A turns on allowing transistor Q2 to turn on.

Transistor Q2 turns on at zero volts if diode 114a is conducting. At light load or high line, the discharge of parasitic capacitors 114b and 115a will not be complete. This situation is still better, however, than turning transistor Q2 on with the full line voltage across parasitic capacitors 114b and 115a. At heavy loads, turn-on losses will essentially be eliminated, while at lighter loads losses at turn-on will be higher but the saturation losses will be lower. Accordingly, high switching losses and high saturation losses do not occur at the same time. Of course, by lowering magnetizing inductance 128, turn on switching losses can essentially be eliminated even at no load.

Time Period P5

When $V_{AB}$ of transformer T2 returns to zero, $V_{GS}$ of transistor Q3 does not change since transistor Q3A is still off and its parasitic diode 66 is reverse biased. Gate capacitances 109a and 109b of transistor Q3 hold their charge and transistor Q3 stays on. Transistor Q2 turns off quickly due to parasitic diode 78 of transistor Q2A.

Parasitic diode 112a of transistor Q1 turns on when parasitic capacitor 112b discharges, causing current to circulate among devices Q3, T1 and 112a.

As can be seen from the foregoing description, the turn-on cycle and switching and conducting mechanisms experienced by switching transistors Q1 and Q4 apply to switching transistors Q3 and Q2 respectively, as Q2 performs the function of Q4 in the second half of the cycle (time period P3–P0) and Q3 performs the function of Q1 in the second half of the cycle.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A full bridge power converter circuit comprising:
   a bridge circuit having a separate primary switching means connected in each of the four legs thereof;
   direct-current power supply means connected across one diagonal of the bridge circuit;
   inductive load means connected across the other diagonal of the bridge circuit;
   a drive transformer having a primary winding and four secondary windings;
   control signal means for supplying an alternating control signal to the primary winding of the drive transformer; four separate secondary switching means individually coupling different ones of the drive transformer secondary windings to different ones of the primary switching means for controlling current flow conduction through the primary switching means;
   the secondary windings and secondary switching means being connected so that a first and a fourth of the primary switching means are conductive during a first half cycle of the bridge circuit operation and a second and a third of the primary switching means are conductive during a second half cycle of the bridge circuit operation, the first and fourth primary switching means being located in a first opposite pair of bridge circuit legs and the second and third primary switching means being located in the other opposite pair of bridge circuit legs;
   first capacitor means connected to the secondary switching means for the fourth primary switching means for delaying the start of conduction in the fourth primary switching means for an initial portion of the first half cycle of the bridge circuit operation; and second capacitor means connected to the secondary switching means for the second primary switching means for delaying the start of conduction in the second primary switching means for an initial portion of the second half cycle of the bridge circuit operation.

* * * * *